United States Patent [19]
Kurachi

[11] 3,844,060
[45] Oct. 29, 1974

[54] LIVE BAIT FISHING LURE
[76] Inventor: Masami Mike Kurachi, 2031 Yosemite Blvd., Modesto, Calif. 95351
[22] Filed: Oct. 29, 1973
[21] Appl. No.: 410,419

[52] U.S. Cl. .............................. 43/41, 43/42.48
[51] Int. Cl. .............................. A01k 85/00
[58] Field of Search ........... 43/42.47, 42.48, 42.06, 43/42.23

[56] References Cited
UNITED STATES PATENTS

| | | | |
|---|---|---|---|
| 1,331,618 | 2/1920 | Brown | 43/42.23 |
| 1,700,061 | 1/1929 | Kimmich | 43/42.48 |
| 1,981,091 | 11/1934 | Clark | 43/42.23 |
| 2,008,004 | 7/1935 | Catarau | 43/42.06 |

Primary Examiner—Warner H. Camp
Attorney, Agent, or Firm—Hubert E. Dubb

[57] ABSTRACT

A live bait carrying fishing lure is disclosed which is specially designed to travel through the water in a stabilized direction of travel and is further designed to have a wiggling or bobbing motion to attract fish to strike. Proper characteristics of flow about the lure are assured through use of a planar member which extends from the vicinity of the front of the lure and which is bent downwardly at a point removed from the lure. The planar member generally has a pair of wings extending upwardly from its sides to stabilize the direction of travel of the lure. The planar member generally has attached thereto two rings for attachment to a fish line. One of the rings is useful for fishing for deep dwelling fish and the other ring is useful for fishing for surface preferring fish.

6 Claims, 5 Drawing Figures

PATENTED OCT 29 1974 3,844,060
FIG.1
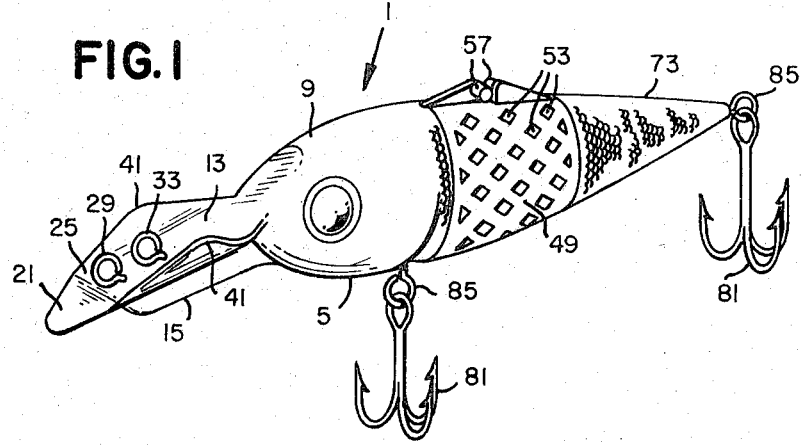
FIG.2
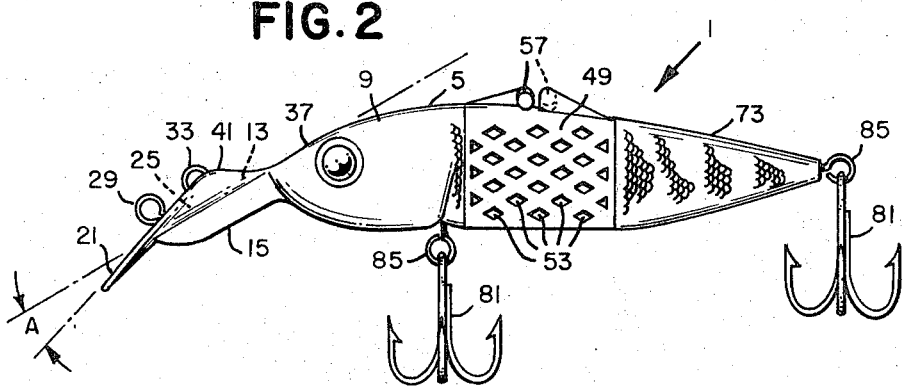
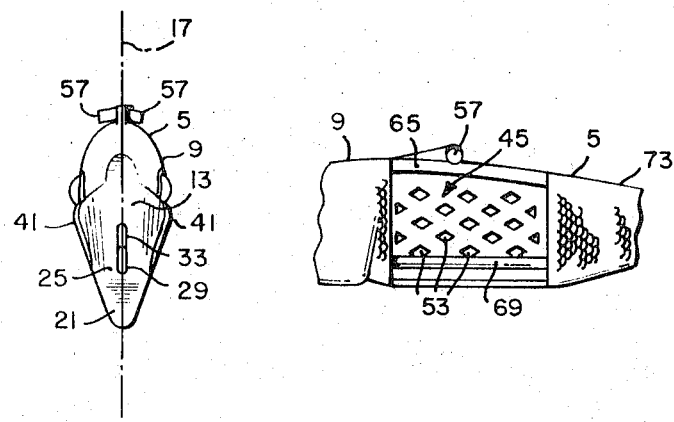
FIG.4
FIG.3
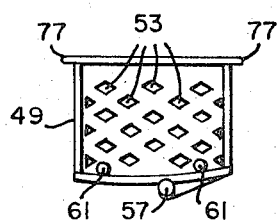
FIG.5

LIVE BAIT FISHING LURE

BACKGROUND OF THE INVENTION

The prior art is replete with fishing lures and a number of these lures have provision for carrying live bait. Prior art patents of interest in this regard include U.S. Pat. Nos. 1,278,146; 1,816,725; 2,828,571; 2,839,866; 2,933,846; 3,280,497 and 3,303,597. Some of these lures taught by the prior art have lips adjacent the front of a fish shaped portion of the lure which lips may tend to cause the lure to move in one manner or another when being towed through the water.

It is highly desirable that a fishing lure have a number of attributes included among which are the carrying of live bait the scent and taste of which can easily escape from the lure to attract fish, the appearance of natural bait such as, for example, a small fish, the movement through the water with a wiggling or bobbing motion characteristic of some small fish, the movement through the water in a stable and substantially straight direction of travel and the ability to be used for both relatively deep fishing and relatively shallow fishing. The present invention provides a fishing lure which satisfies each of these criteria.

SUMMARY OF THE INVENTION

The invention comprises a fishing lure designed when towed to emulate the travel of fish through water, comprising: A generally fish shaped body; a substantially planar member extending from the vicinity of the front of the fish shaped body, said substantially planar member defining a plane substantially perpendicular to the plane of symmetry of the fish shaped body; a generally planar tip extending from the end of said planar member furthest from said fish shaped body, the plane defined by said tip forming an acute angle with the extension of the plane defined by said planar member and being substantially perpendicular to the plane of symmetry of the fish shaped body, said tip serving to impart a wiggling or bobbing motion to said lure; and a plurality of supports adapted for being fastened to a fish line, said supports being attached to the top of said planar member progressively farther from the front end of the fish shaped body whereby the support nearest the front of the fish shaped body is the more useful for deep fishing and the support nearest the tip is the more useful for shallow fishing.

It is preferred that the plane defined by the substantially planar member is substantially tangent to the back of the fish shaped body adjacent the extending of the planar member from the vicinity of the front of the fish shaped body. It is also preferred that the lure include a pair of wings, one on each side of the planar member, the wings extending upwardly from the planar member to stabilize the direction of travel of the lure. It is also preferred that the lure includes within the body a cavity adapted to receive bait, a door providing access to the cavity, and a plurality of small openings communicating the cavity with the outside of the body whereby fish are attracted by the bait.

BRIEF DESCRIPTION OF THE DRAWINGS

The invention will be better understood by reference to the drawings which are incorporated herein by reference thereto and wherein;

FIG. 1 is a prospective view illustrating a fishing lure produced in accordance with the present invention.

FIG. 2 is a side view further illustrating the fishing lure shown in FIG. 1.

FIG. 3 is a front view illustrating primarily the planar member and planar tip attached in the vicinity of the front of the fish shaped body illustrated in FIGS. 1 and 2.

FIG. 4 illustrates the cavity within the fish shaped body; and

FIG. 5 illustrates the door to the cavity within the fish shaped body.

DESCRIPTION OF THE PREFERRED EMBODIMENT

In the figures of the drawing like numbers denote like parts throughout.

Referring first to FIG. 1, there is illustrated in a perspective view a preferred embodiment of the invention comprising a fishing lure designated generally by the numeral 1. The fishing lure includes a generally fish shaped body 5. Attached to the head portion 9 of the fish shaped body 5 is a substantially planar member 13, the planar member 13 being in a plane substantially perpendicular to the plane of symmetry 17 of the fish shaped body 5.

A generally planar tip 21 is shown as extending from the forward end 25 of the planar member 13 which is the end furthest from the fish shaped body 5. The plane defined by the tip, as can be seen most readily from FIG. 2, forms an acute angle A, generally less than about 20° with the extension of the plane defined by the planar member 13, the angle A being measured downwardly from the plane defined by the planar member 13.

Attached atop the planar member 13 are the two supports 29 and 33 to which fishing lines are attachable. The support 29 is the more useful for shallow fishing and the support 33 is the more useful for deep fishing.

As will be most apparent from FIG. 2, the plane defined by the substantially planar member 13 is, in the preferred embodiment of the invention, substantially tangent to the back 37 of the head 9 of the fish shaped body 5 adjacent the extending of the planar member 13 from the vicinity of the head 9 of the fish shaped body 5. With the tip 21 pointing downwardly at acute angle A, a wiggling or bobbing motion is imparted to the lure 1 as it is pulled through the water most especially when it is used for shallow fishing in which case the support 29 is utilized for fastening to a fish line. The turbulence of the motion through the water is further kept at a more desirable level and smooth pulling of the line through the water is assured when the substantially planar member 13 is placed so that the planar member 13 is substantially tangent to the back 37 of the fish shaped body 5 adjacent the extending of the planar member 13 from the vicinity of the head 9 of the fish shaped body 5.

The support 15 is provided beneath the planar member 13 to supply added rigidity thereto.

As the lure is pulled forwardly through the water as by being towed by the shallow support 29 it will be apparent that the action of the water will tend to force the tip 21 downwardly and that as the fishing line pulls upon the support 29 the lure 1 will be alternatively jerked upwardly, hence the wiggling or bobbing motion will be produced. When the support 33 is attached to the fishing line, it is apparent that a greater force will result downwardly on the tip 21 and the front portion of the planar member 13 thereby causing the lure 1 to travel somewhat deeper in the water. Thus, the lure 1 is useful for deep fishing as well as shallow fishing. It is clear that if desired more than two supports can be provided along the length of the planar member 13 thereby providing for fishing at a number of depths.

A pair of wings 41 in the preferred embodiment of the invention extend upwardly and preferably slightly outwardly from the planar member 13, the wings 41 being positioned near the side of and upon the planar member 13 and longitudinally thereof. The upward and outward extension of the wings 41 adds stability to the direction of travel of the lure 1. For example, when the lure 1 is being pulled forwardly through the water by a fishing line attached to the shallow support 29, water passing over the planar member 13 must pass between the wings 41 and thence over the fish shaped body 5. This greatly stabilizes the direction of flow of the lure 1 through the water. Thus, should the plane of the planar member 13 be tilted significantly from being perpendicular to the plane of symmetry 17 of the fish shaped body 5 a fairly common occurrence with mass produced items, any tendency for the fish to flip over as a result of this tilting is minimized or eliminated. This greatly reduces the number of lures which must be rejected because of manufacturing errors.

In the preferred embodiment of the invention the lure 1 preferably includes a cavity 45 therein adapted to hold bait. The cavity 45 is reached by opening the door 49. In order for the bait to serve its purpose, it is necessary that the fish shaped body 5 and/or the door 49 have a plurality of openings therein 53 which communicate the cavity with the outside of the fish. The openings further add a small localized turbulence which can be attractive to fish. As illustrated in the figures, in the preferred embodiment of the invention the cavity 45 and access thereto is provided in the lure 1 without significantly affecting the shape of the fish shaped body 5. Access to the cavity 49 is provided by simply snapping open the biased external snaps 57. Extra security for sealing of the door 49 is provided by the internal snaps 61 illustrated in FIG. 5 which in the closed position are biased against the ridge 65. Because of the location of the cavity 45 in substantially the center of the fish shaped body 5 and because of the hidden and streamlined character of the cavity 45 within the fish shaped body 5, it is advisable that added structural strength be provided for the fish shaped body 5 as by providing the strut 69 which connects the head 9 of the fish shaped body 5 with the tail 73 of the fish shaped body 5. Referring to FIGS. 4 and 5, it will be apparent that the door 49 mates with the body 5 adjacent the cavity 45 by simply snapping the nubs 77 into appropriate recesses in the fish shaped body 5 adjacent the cavity 45.

As will be apparent from FIGS. 1 and 2, appropriate hooks 81 are attached to the lure 1 at the eyes 85.

In order to insure that the lure 1 is attractive to a fish and that it moves through the water in a desirable manner it is preferred that the total length of the planar member 13 plus the tip 21 is no more than about one-half the length of the fish shaped body 5.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A fishing lure designed when towed to emulate the travel of the fish through water comprising:
   a generally fish shaped body;
   a substantially planar member extending from the vicinity of the top front of the fish shaped body, said substantially planar member defining a plane substantially perpendicular to the plane of symmetry of the fish shaped body;
   a generally planar tip extending from the end of the planar member further from the fish shaped body, the plane defined by the tip forming an acute angle with the extension of the plane defined by said planar member and being substantially perpendicular to the plane of symmetry of the fish shaped body, the tip serving to impart a wiggling or bobbing motion to the lure; and a plurality of supports adapted for being fastened to a fish line, said supports being attached to the top of said planar member progressively farther from the front of the fish shaped body whereby the support nearest the front of the fish shaped body is the more useful for deep fishing and the support nearest the tip is the more useful for shallow fishing; and
   a pair of wings, one on each side of the planar member, the wings extending upwardly from the planar member and logitudinally thereof whereby water passing over the planar member as the lure is being pulled forwardly through the water passes between the wings and thence over the top of the fish shaped body thereby stabilizing the direction of travel of the lure.

2. A lure, as in claim 1, further characterized in that the plane defined by the substantially planar member is substantially tangent to the back of the fish shaped body adjacent the extending of the planar member from the vicinity of the front of the fish shaped body to allow a smooth pulling of the lure through the water.

3. A lure, as in claim 2, wherein said pair of wings each extend outwardly as well as upwardly from said planar member to cooperatively further stabilize the direction of travel of the lure.

4. A lure, as in claim 2, wherein said body includes a cavity therein adapted to hold bait, a door providing access to the cavity, and a plurality of openings communicating the cavity with the outside of the body whereby fish are attracted by the bait.

5. A lure, as in claim 4, wherein the cavity includes a support strut fastened therethrough linearly of said fish shaped body to provide said body with added structural strength.

6. A lure, as in claim 5, wherein said planar member plus said tip extend no more than about one-half of the length of said fish shaped body.

* * * * *